June 3, 1941. W. O. LYTLE 2,244,468
HEAT-ABSORBING GLASS AND METHOD OF PRODUCING SAME
Filed April 26, 1938

Fig. 2.

Fig. 1.

INVENTOR
WILLIAM O. LYTLE
By Bradley & Bee
ATTORNEYS.

Patented June 3, 1941

2,244,468

UNITED STATES PATENT OFFICE 2,244,468

HEAT-ABSORBING GLASS AND METHOD OF PRODUCING SAME

William O. Lytle, New Kensington, Pa., assignor to Pittsburgh Plate Glass Company, Allegheny County, Pa., a corporation of Pennsylvania Application April 26, 1938, Serial No. 204,357

3 Claims. (Cl. 49—83.1)

The present invention relates to a diathermic or heat-absorbing glass and special spectrum-filtering glasses, and more particularly to processes for the production of such glasses.

The primary object of my invention is to provide sheet glass having a diathermic or heat-absorbing and spectrum-filtering characteristics.

Another object of my invention is to provide processes for the continuous production of such glasses.

These and other objects and advantages of my invention will be readily apparent from the following detailed description and the accompanying drawing, wherein:

Figure 1 is a vertical section of apparatus which is adapted to introduce heat-absorbing glass into the center of a sheet of glass by the drawing process, and, Figure 2 is a similar view of another form of apparatus which is adapted to introduce a layer of heat-absorbing glass into the center of a sheet of glass by the rolling process.

The heat-absorbing glass-forming ingredients may consist of the following in the proportions stated:

| | Pounds |
|---|---|
| $SiO_2$ | 1000 |
| $Na_2CO_3$ | 296 |
| CaO | 296 |
| MgO | 10 |
| $Na_2SO_4$ | 86 |
| $Fe_2O_3$ | 100 |

In the above batch mixture having a total weight of 1788 pounds, the ingredients specified will be present in approximately the following percentages, by weight:

| | Per cent by weight |
|---|---|
| $SiO_2$ | 55.7 |
| $Na_2CO_3$ | 16.5 |
| CaO | 16.5 |
| MgO | .55 |
| $Na_2SO_4$ | 4.90 |
| $Fe_2O_3$ | 5.65 |

Instead of using the batch mixture mentioned above, the following ingredients may be employed to form a heat-absorbing glass:

| | Per cent by weight |
|---|---|
| $SiO_2$ | 69.69 |
| $Na_2O$ | 13.66 |
| $K_2O$ | .63 |
| CaO | 11.91 |
| MgO | .70 |
| $Na_2SO_4$ | .86 |
| $Na_2CO_3$ | .09 |
| $Sb_2O_3$ | .72 |
| CoO | trace |
| $Al_2O_3$ | 1.29 |
| $Fe_2O_3$ | .45 |

Where it is desired to produce a heat-absorbing glass which is also protective against X-rays, and impenetrable to violet rays, the following composition may be utilized:

| | Per cent by weight |
|---|---|
| $SiO_2$ | 28.17 |
| PbO | 61.30 |
| BaO | 9.7 |
| $Sb_2O_5$ | .46 |
| $R_2O_3$ | .37 |

($R_2O_3$ represents iron, alumina, etc.)

Another composition which is effective in producing a heat-absorbing glass is as follows:

| | Parts |
|---|---|
| Sand | 1000 |
| Soda-ash | 308 |
| Borax | 15.4 |
| Limestone | 154 |
| Nitre | 30.8 |
| Manganese dioxide | 0.15 |
| Titanium oxide | 0.05 |
| Nickel oxide | 0.06 |
| Artificial biotite | 31 |

The artificial biotite consists of the following ingredients which are finely ground and well mixed before being added to the other ingredients of the batch:

| | Parts |
|---|---|
| Micaeous haematite | 40 |
| Precipitated alumina | 5 |
| Solid sodium silicate | 50 |
| Magnesite | 5 |
| Manganese dioxide | 0.066 |

In the different batch compositions mentioned above, the ferric oxide and cobaltic oxide serve as heat-absorbing agents and the latter compound is particularly useful as an infra red rays absorption agent. The amount of ferric oxide may be increased to approximately 8% by weight.

Referring to the construction shown in Figure 1, which illustrates an apparatus for continuously drawing glass having a central layer of heat-absorbing glass and outer layers of ordinary glass, the apparatus shown is a sheet-drawing tank of the Slingluff type. In this structure, 50 is the usual melting tank and 51 is the forehearth, 52 being a skim bar, 53, 53 L blocks, and 54, 55 cover members. The conventional type of leer for drawing the sheet continuously is employed. Such leer comprises a casing 56, provided with pairs of driven rolls 57 which grip the sides of the sheet. The glass sheet 58 is cut into sections as it emerges from the top of the leer in accordance with sheet glass practice. The forehearth is also provided with edge rolls 59, 59 for maintaining the width of the sheet. The clay draw-bar 60 which functions to define the line of draw of the sheet and give a cooler body of glass thereabove than in the body of the forehearth, as is well known in the sheet-drawing art, has extending therethrough a metal pipe 61 provided along its upper side with small perforations 62. The pipe extends through the side wall of the tank and in operation, heat-absorbing glass (of the kinds mentioned above) in molten form is supplied thereto under pressure. The molten glass passing through the perforations 62 makes its way through corresponding registering perforations in the clay draw bar and into the center of the glass sheet 58 at the base of the sheet 58, thus providing a sheet having a central portion of heat-absorbing glass and outer surfaces of ordinary glass.

Referring to the construction shown in Figure 2, which illustrates a modification in which a slotted pot 63, carrying a body 64 of heat-absorbing glass (of the types mentioned above), is mounted above the pot 65 of a plate glass tank, such tank being located to the right and being of the usual regenerator type. The glass which forms the sheet 66 is withdrawn from the tank through a slot 67 and passes between the usual water-cooled and driven sizing rolls 68, 68. This sheet then passes over a roller runway 69 and through the usual roller leer, well known in the art. A pair of burners 70, 70 are provided in the sides of the slotted pot 63 to melt the body 64 of heat-absorbing glass and to maintain the glass in molten condition during the operation of the apparatus or, if desired, the glass may be melted in a separate pot and then placed in pot 63. The framework 71 of the slotted pot 63 is provided with wheels 72 running upon the channels 73, which channels are supported from an overhead lifting crane (not shown) by the depending members 74. The lower portion of the slotted pot 63 projects down through an opening in the cover or arch, as illustrated, so that the outlet slot 75 extends below the surface of the bath 65. The molten glass 64 in the pot 63 moves forward beneath the surface layer of the bath 65 so that it form the middle or central portion of sheet 66.

The outlet slot 75 is provided with a gate 76 having a stem 77 pivotally connected at its upper end to the bell-crank lever 78. This lever is pivoted at 79 upon a bracket 80 and its end is provided with a series of slots 81 adapted to be engaged by the hook 82. Means are thus provided for holding the gate in open or closed position and for regulating its intermediate positions in order to control the flow of heat-absorbing glass which forms the central portion of glass sheet 66.

Glass sheets produced according to the processes stated above and having a layer of heat-absorbing glass forming the central portion of the sheet will transmit incident light but are effective to cut off a large proportion of heat rays by absorption thereof. Such a glass will also absorb ultra-violet rays. It will reduce glare and transmit all the colors of the spectrum but it will cut off invisible rays at each end of the spectrum.

The foregoing detailed description has been given for clearness of understanding only and no unnecessary limitations should be understood therefrom.

What I claim is:

1. A process of manufacturing sheet glass from a molten glass bath which comprises drawing sheet glass from the body of said molten bath along a predetermined plane of drawing, introducing molten heat-absorbing glass into the body of the bath below the beginning of the meniscus of the sheet formed by the drawing action, passing said heat-absorbing glass through a portion of the bath body toward the plane of drawing and drawing said heat-absorbing glass as a central core homogeneously merged in the finished glass sheet while maintaining the outer surfaces of the drawn sheet free from the heat-absorbing glass.

2. A process of manufacturing sheet glass from a molten glass bath which comprises forming in a rolling operation sheet glass from the body of said molten bath along a predetermined plane of rolling, introducing molten heat-absorbing glass into the body of the bath below the surface thereof and at a location materially spaced from the location of the beginning of the rolling operation, passing said heat-absorbing glass through a portion of the bath body toward the plane of rolling, and rolling said heat-absorbing glass as a central core homogeneously in the finished glass sheet while maintaining the outer surfaces of the drawing sheet free from the heat absorbing glass.

3. A process of manufacturing sheet glass from a molten glass bath which comprises forming sheet glass from the body of said molten bath along a predetermined plane, introducing molten heat-absorbing glass into the body of the bath below the surface thereof and at a location materially spaced from the location of the beginning of the sheet-forming operation, passing said heat-absorbing glass through a portion of the bath body toward the beginning of the formation of said sheet glass, and forming said heat-absorbing glass as a central core homogeneously merged in the finished glass sheet while maintaining the outer surfaces of the sheet glass free from the heat-absorbing glass.

WILLIAM O. LYTLE.